US012627523B2

(12) United States Patent
Kotvis et al.

(10) Patent No.: US 12,627,523 B2
(45) Date of Patent: May 12, 2026

(54) SELECTIVE FORWARDING, PRIORITIZATION, AND QUEUEING BY EDGE DEVICES

(71) Applicant: Insight Direct USA, Inc., Chandler, AZ (US)

(72) Inventors: Benjamin Kotvis, Sussex, WI (US); Marc Brumfield, Lemont, IL (US)

(73) Assignee: Insight Direct USA, Inc., Chandler, AZ (US)

( * ) Notice: Subject to any disclaimer, the term of this patent is extended or adjusted under 35 U.S.C. 154(b) by 419 days.

(21) Appl. No.: 18/218,743

(22) Filed: Jul. 6, 2023

(65) Prior Publication Data

US 2024/0340196 A1 Oct. 10, 2024

Related U.S. Application Data

(60) Provisional application No. 63/457,666, filed on Apr. 6, 2023.

(51) Int. Cl.
*H04L 12/28* (2006.01)
*H04L 45/00* (2022.01)
*H04L 45/28* (2022.01)

(52) U.S. Cl.
CPC .......... *H04L 12/2854* (2013.01); *H04L 45/22* (2013.01); *H04L 45/28* (2013.01)

(58) Field of Classification Search
CPC ...... H04L 45/22; H04L 12/2854; H04L 45/28
See application file for complete search history.

(56) References Cited

U.S. PATENT DOCUMENTS 6,976,090 B2 12/2005 Ben-Shaul et al.
7,447,909 B2 11/2008 Reith
(Continued)

FOREIGN PATENT DOCUMENTS

CN 100583820 C 1/2010
CN 101741869 B 4/2013
(Continued)

OTHER PUBLICATIONS

Huawei, "IoT Device Management: Product Introduction", Date Jun. 25, 2019, Issue 01, Huawei Technologies Co., Ltd., #2.2.1 Rule Engine. (Year: 2019).*

(Continued)

*Primary Examiner* — Brian J. Gillis
*Assistant Examiner* — Chhian (Amy) Ling
(74) *Attorney, Agent, or Firm* — Kinney & Lange, P.A.

(57) ABSTRACT

A method of selectively forwarding data transmissions to a wide area network includes receiving, from at least one local device and by a network device interposed between the at least one local device and the wide area network, first and second data transmissions intended for first and second destination addresses, respectively, accessible through the wide area network, detecting that a connection between the network device and the wide area network has been interrupted, storing the first data transmission and the second data transmission to a storage device electronically connected to the network device, and detecting that the connection has been restored. The method further includes generating a forwarding order by analyzing the first data transmission and the second data transmission using a forwarding rules engine, the forwarding order describing an order in which to transmit the first data transmission and the second data transmission.

20 Claims, 6 Drawing Sheets

(56) References Cited

U.S. PATENT DOCUMENTS

| | | | |
|---|---|---|---|
| 8,073,970 | B2 | 12/2011 | Schwimer |
| 8,161,159 | B1 | 4/2012 | Shetty et al. |
| 8,423,672 | B2 | 4/2013 | Liu et al. |
| 8,660,115 | B2 | 2/2014 | Cranor et al. |
| 8,880,587 | B2 | 11/2014 | Cobb et al. |
| 8,881,285 | B2 | 11/2014 | Macwan et al. |
| 9,043,428 | B2 | 5/2015 | Lobo et al. |
| 9,154,419 | B2 | 10/2015 | Zhou |
| 9,258,227 | B2 | 2/2016 | Ghosh et al. |
| 9,525,563 | B2 | 12/2016 | Zhou et al. |
| 9,607,097 | B2 | 3/2017 | Chan |
| 9,729,675 | B2 | 8/2017 | Luecke et al. |
| 9,742,657 | B2 | 8/2017 | Narayanan et al. |
| 9,800,683 | B2 | 10/2017 | Phillips et al. |
| 9,888,003 | B2 | 2/2018 | Harrang et al. |
| 9,923,897 | B2 | 3/2018 | Houston et al. |
| 9,942,825 | B1 | 4/2018 | Narayanan |
| 10,140,125 | B1 | 11/2018 | Bhasin et al. |
| 10,270,817 | B2 | 4/2019 | Weihl et al. |
| 10,298,615 | B2 | 5/2019 | Gero et al. |
| 10,567,269 | B2 | 2/2020 | Chakra et al. |
| 10,735,503 | B2 | 8/2020 | Shattil |
| 10,743,036 | B1 | 8/2020 | Farris et al. |
| 10,958,662 | B1 | 3/2021 | Sole et al. |
| 10,977,747 | B2 | 4/2021 | Blumofe et al. |
| 10,979,341 | B2 | 4/2021 | Uttaro et al. |
| 11,032,387 | B2 | 6/2021 | Newton et al. |
| 11,218,437 | B2 | 1/2022 | Chen et al. |
| 11,228,950 | B2 | 1/2022 | Shen |
| 11,412,060 | B2 | 8/2022 | Yanagihara et al. |
| 11,431,776 | B2 | 8/2022 | Upadhyaya et al. |
| 11,438,371 | B2 | 9/2022 | Nainar et al. |
| 11,457,091 | B2 | 9/2022 | Crowder et al. |
| 11,477,846 | B2 | 10/2022 | Fang et al. |
| 11,483,594 | B2 | 10/2022 | Kalish |
| 11,546,767 | B1 | 1/2023 | Shaw et al. |
| 11,570,666 | B2 | 1/2023 | Ghadge et al. |
| 11,575,481 | B2 | 2/2023 | Han et al. |
| 11,588,885 | B2 | 2/2023 | Choi |
| 11,593,446 | B2 | 2/2023 | Shribman et al. |
| 11,611,504 | B2 | 3/2023 | Shenoy |
| 11,611,507 | B2 | 3/2023 | Ramaswamy et al. |
| 11,611,508 | B2 | 3/2023 | Yang |
| 11,611,905 | B2 | 3/2023 | Yu |
| 11,811,730 | B1 * | 11/2023 | Kandasamy ........ H04L 61/5046 |
| 2005/0198379 | A1 * | 9/2005 | Panasyuk ........... H04L 12/4633 |
| | | | 709/224 |

| | | | |
|---|---|---|---|
| 2013/0054831 | A1 | 2/2013 | Calo et al. |
| 2015/0110098 | A1 * | 4/2015 | Zhang ................. H04L 12/2834 |
| | | | 370/338 |
| 2018/0287859 | A1 * | 10/2018 | Desigowda ........... H04L 41/342 |
| 2019/0173819 | A1 * | 6/2019 | Wescoe ................. G06F 21/566 |
| 2020/0128096 | A1 * | 4/2020 | Yanagihara ........... H04L 67/568 |
| 2021/0120060 | A1 * | 4/2021 | Upadhyaya ............. H04L 67/52 |
| 2021/0191979 | A1 | 6/2021 | Agrawal et al. |
| 2024/0195839 | A1 * | 6/2024 | Wang ..................... H04L 63/20 |

FOREIGN PATENT DOCUMENTS

| | | |
|---|---|---|
| CN | 101984637 B | 6/2014 |
| CN | 108549719 A | 9/2018 |
| CN | 108307446 B | 1/2020 |
| CN | 108718236 B | 8/2020 |
| CN | 107786520 B | 2/2021 |
| CN | 108495340 B | 6/2021 |
| CN | 110933692 B | 6/2021 |
| CN | 108141465 B | 7/2021 |
| CN | 111491175 B | 8/2021 |
| CN | 110958656 B | 9/2021 |
| CN | 111031102 B | 4/2022 |
| CN | 108174235 B | 5/2022 |
| CN | 113115340 B | 6/2022 |
| CN | 112671880 B | 8/2022 |
| CN | 217116413 U | 8/2022 |
| CN | 112559170 B | 9/2022 |
| CN | 112264309 B | 12/2022 |
| CN | 113422801 B | 12/2022 |
| EP | 1865684 A1 | 12/2007 |
| EP | 2642393 B1 | 9/2019 |
| EP | 3504847 B1 | 6/2022 |
| KR | 102443581 B1 | 9/2022 |
| WO | 2015001495 A1 | 1/2015 |
| WO | 2015036942 A1 | 3/2015 |
| WO | 2016074323 A1 | 5/2016 |
| WO | 2016107391 A1 | 7/2016 |

OTHER PUBLICATIONS

"Lockheed Martin, Juniper Networks Demonstrate Mission-Aware Routing Tech. for Dept of Defense." https://newsroom.juniper.net/news/news-details/2023/Lockheed-Martin-Juniper-Networks-Demonstrate-Mission-Aware-Routing-Technology-for-Department-of-Defense/.

* cited by examiner

600

Generate labeled training data — 602

Train computer-implemented machine learning model with labeled data — 604

Test trained machine learning model with test data — 606

SELECTIVE FORWARDING, PRIORITIZATION, AND QUEUEING BY EDGE DEVICES

CROSS-REFERENCE TO RELATED APPLICATION(S)

The present application claims priority to U.S. provisional patent application Ser. No. 63/457,666 by Benjamin Kotvis, filed Apr. 6, 2023 and entitled "SELECTIVE FORWARDING, PRIORITIZATION, AND QUEUEING BY EDGE DEVICES."

FIELD OF THE INVENTION

The present disclosure relates to network systems and, more particularly, systems and methods for selectively forwarding data transmissions from a local network to a wide area network (WAN).

BACKGROUND

Devices connected to a local network often access resources hosted by servers and other devices connected to another network, such as a WAN. Interruptions to the connection between the local network and the outside network can disrupt functions of devices connected to the local network that are dependent on resources hosted on the outside network.

SUMMARY

An example of a method of selectively forwarding data transmissions to a wide area network includes receiving, from at least one local device and by a network device interposed between the at least one local device and the wide area network, a first data transmission intended for a first destination address accessible through the wide area network and a second data transmission intended for a second destination address accessible through the wide area network, detecting that a connection between the network device and the wide area network has been interrupted, storing the first data transmission and the second data transmission to a storage device electronically connected to the network device, and detecting that the connection has been restored. The first data transmission and second data transmission are stored after detecting that the connection has been interrupted, and the network device detects that the connection has been restored after storing the first data transmission and the second data transmission. The method further includes generating, by the network device and after detecting that the connection has been restored, a forwarding order by analyzing the first data transmission and the second data transmission using a forwarding rules engine, the forwarding order describing an order in which to transmit the first data transmission and the second data transmission. After generating the forwarding order, the first data transmission is transmitted from the storage device to the first destination address and the second data transmission is transmitted from the storage device to the second destination address. The first data transmission and the second data transmission are transmitted according to the forwarding order.

An example of a system includes a network device connected to a local device and to a wide area network. The local device is configured to transmit data to at least one destination address accessible through the wide area network. The network device is configured to receive data transmissions from the local device and to selectively forward data transmissions to destination addresses accessible through the wide area network, and includes a processor and memory. The memory is encoded with instructions that, when executed, cause the processor to receive, from the at least one local device, a first data transmission directed to a first destination address accessible through the wide area network and a second data transmission directed to a second destination address accessible through the wide area network. The instructions further cause the processor to detect that a connection between the network device and the wide area network has been interrupted, store the first data transmission and the second data transmission to a storage device electronically connected to the network device in response to detecting that a connection between the network device and the wide area network has been interrupted, detect, that the connection has been restored, after storing the first data transmission and the second data transmission, and analyze, in response to detecting that the connection has been restored, the first data transmission and the second data transmission using a forwarding rules engine to generate a forwarding order, the forwarding order describing an order in which to transmit the first data transmission and the second data. The instructions cause the processor to transmit, after generating the forwarding order, the first data transmission from the storage device to the first destination address and the second data from the storage device to the second destination address according to the forwarding order.

The present summary is provided only by way of example, and not limitation. Other aspects of the present disclosure will be appreciated in view of the entirety of the present disclosure, including the entire text, claims, and accompanying figures.

DETAILED DESCRIPTION

The present description relates to systems and methods for selective forwarding of outgoing data transmissions from a queueing network device. The queueing network devices of the present description are able to be integrated into existing local networks at a point between the local network and an outside or external network, such as the Internet or another WAN, that causes network traffic to pass through the queueing network device and allows the queueing network device to selectively forward outgoing transmissions or store the outgoing transmissions for later forwarding. The queueing network devices of the present description are also able to create forwarding orders that can be used to queue or otherwise create an order in which a group of outgoing data transmissions can be transmitted from a local network to a WAN.

Applications and software are often reliant on a persistent or continuous network connection and can encounter errors in attempting to transmit data to a WAN (e.g., the Internet) when the connection to the WAN is interrupted. Advantageously, the systems and methods disclosed herein allow for data transmissions from local devices to be temporarily stored when a connection to a WAN is disrupted (e.g., in examples where a network connection is intermittent) and be uploaded by a queueing network device located between the local devices and the WAN when the connection to the WAN is restored.

Further, the systems and methods disclosed herein allow for outgoing data transmissions to be temporarily stored by a queueing network device when data transmission and/or access to a WAN or a WAN-connected resource is associated with increased costs and uploaded at a subsequent point in time when the access of the WAN or WAN-connected resource does not incur the increased costs. Further, the systems and methods disclosed herein can advantageously be performed by a single device that can be incorporated into existing network structures with minimal modification of those existing network structures. Rather, the systems and methods disclosed herein allow for the creation of a queueing network device capable of inspecting outbound data transmissions and automatically determining whether to forward data transmissions or temporarily store the data transmissions to local storage. The local storage used to temporarily store data transmissions is accessible by the queueing network device and can be integrated without modification of the local devices connected to the queueing network device. Accordingly, the queueing network devices disclosed herein can advantageously be integrated into existing local networks with significantly less labor and at lower cost than existing techniques for providing delayed data transmission forwarding for intermittently-connected and/or metered/data-capped networks.

Figure 1:
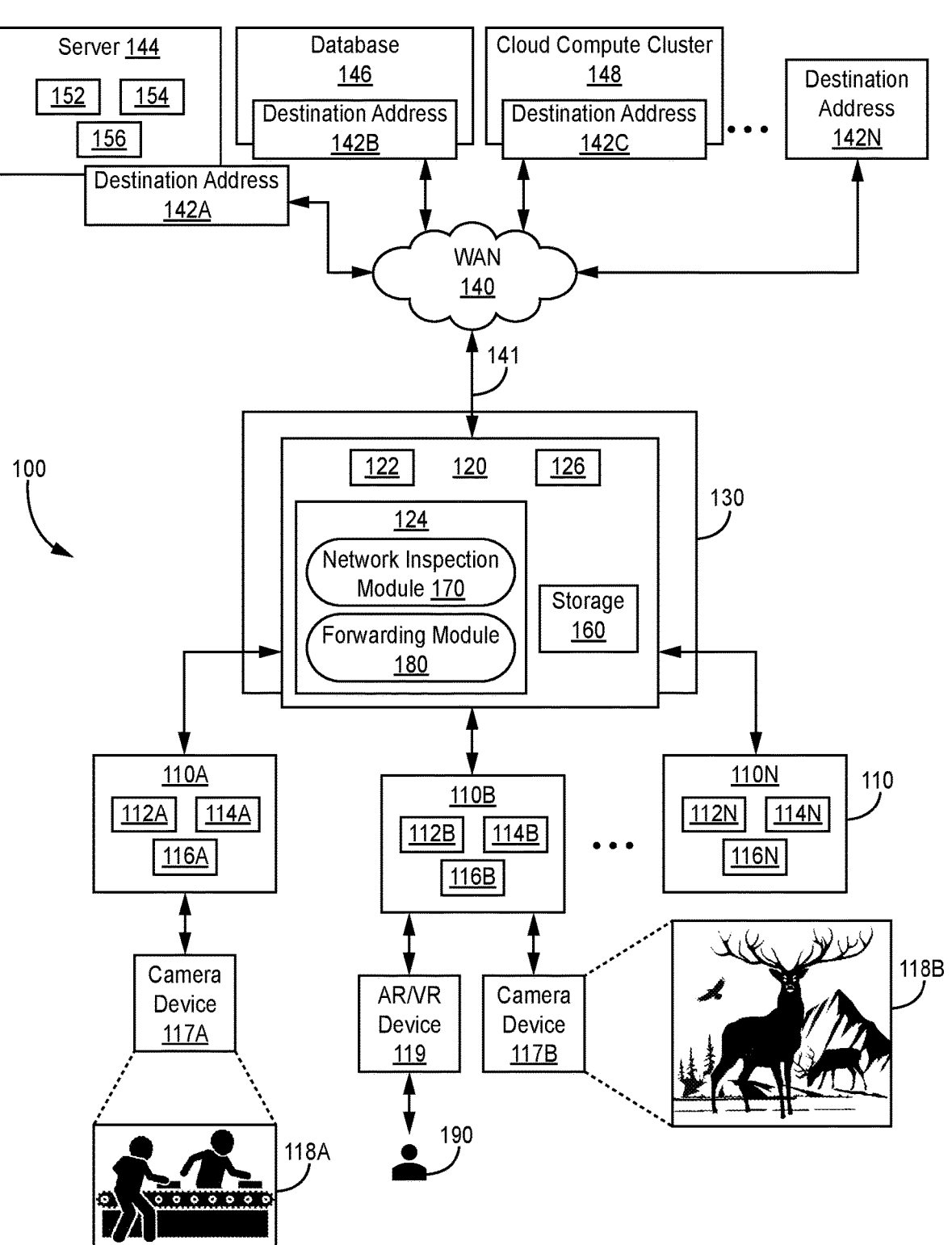
FIG. 1 is a schematic view of an example of a system for data transmission queueing and prioritization.

FIG. 1 is a schematic diagram of system 100, which is a system for data transmission queueing and prioritization. More specifically and as will be described in more detail subsequently, system 100 allows for queueing and prioritization of uploads or outbound data transmissions. System 100 includes local devices 110A-N, queueing network device 120, and destination addresses 142A-N. Queueing network device 120 is a device of local network 130 and is in electronic communication with wide area network (WAN) 140, through which destination addresses 142A-N are accessible. Local devices 110A-N include processors 112A-N, memories 114A-N, and user interfaces 116A-N. Local device 110A includes camera 117A capturing scene 118A. Local device 110B includes camera 117B capturing scene 118B and further includes AR/VR device 119. Queueing network device 120 includes processor 122, memory 124, and user interface 126. Queueing network device is connected to WAN 140 via communication link 141. Destination address 142A corresponds to server 144, destination address 142B corresponds to database 146, and destination address 142C corresponds to cloud compute cluster 148. Server 144 includes processor 152, memory 154, and user interface 156. Destination address 142B corresponds to database 146 and destination address 142C corresponds to cloud compute 148. Queueing network device 120 includes storage 160, and memory 124 includes network inspection module 170, and forwarding module 180.

Local devices 110A-N are electronic devices connected to queueing network device 120. Local devices 110A-N are collectively referred to herein as "local device 110" or "local devices 110." Local devices 110A-N include processors 112A-N, memories 114A-N, and user interfaces 116A-N, respectively. Each of local devices 110A-N can be, for example, a computer, an unmanned aerial vehicle, an electronic sensor, a computer vision device, an automated guided vehicle, a virtual reality device, or an augmented reality device, among other options. All of local devices 110A-N include networking capability such that each local device 110 can connect to queueing network device 120 and/or another component of network 130 that is in communication with queueing network device 120. Local devices 110A-N can be connected via a wireless and/or wired connection to queueing network device 120 and/or local network 130. Each local device 110 can be directly connected to queueing network device 120 and/or can be connected queueing network device 120 via one or more interposed components of network 130. In examples where a local device 110 is directly connected to queueing network device 120, the local device 110 can send data directly to and receive data directly from queueing network device 120. In examples where a local device 110 is connected to queueing network device 120 via one or more interposed components of local network 130 (e.g., one or more routers, switches, gateways, etc.), the local device 110 can send data to and receive data from queueing network device 120 through the intervening components.

Each of processors 112A-N can execute software, applications, and/or programs stored on memories 114A-N, respectively. Examples of processors 112A-N can include one or more of a processor, a microprocessor, a controller, a digital signal processor (DSP), an application specific integrated circuit (ASIC), a field-programmable gate array (FPGA), or other equivalent discrete or integrated logic circuitry. Each of processors 112A-N can be entirely or partially mounted on one or more circuit boards.

Each of memories 114A-N is configured to store information and, in some examples, can be described as a computer-readable storage medium. Each of memories 114A-N, in some examples, can be described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, one or more of memories 114A-N is a temporary memory. As used herein, a temporary memory refers to a memory having a primary purpose that is not long-term storage. One or more of memories 114A-N, in some examples, is described as volatile memory. As used herein, a volatile memory refers to a memory that that the memory does not maintain stored contents when power to the memory is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on a local device 110 to temporarily store information during program execution.

One or more of memories 114A-N, in some examples, also includes one or more computer-readable storage media. Memories 114A-N can be configured to store larger amounts of information than volatile memory. One or more of memories 114A-N can further be configured for long-term storage of information. In some examples, one or more of memories 114A-N includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interfaces 116A-N are input and/or output devices and enable an operator to control operation of local devices 110A-N, respectively. Each of user interfaces 116A-N can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

Local device 110A and local device 110B are connected to camera 117A and camera 117B, respectively. Camera devices 117A, 117B are devices for capturing video data. Camera devices 117A, 117B are in electronic communication with local devices 110A, 110B and are capable of sending captured video to local devices 110A, 110B. Camera devices 117A, 117B are shown as separate devices from local devices 110A, 110B in FIG. 1, but in other examples camera 117A and/or camera 117B can be integrated and form a single device with local device 110A and local device 110B, respectively. In the depicted example, camera 117A captures video data of scene 118A and camera 117B captures video data of scene 118B. In the depicted example, scene 118A is footage of an assembly line and scene 118B is footage from a camera in a natural setting (e.g., a wildlife or trail camera). Local device 110B is also connected to AR/VR device 119. AR/VR device 119 is an augmented reality and/or virtual reality device that is connected to local device 110 and is usable by user 190.

Local devices 110 can send data to WAN 140 and, more specifically, to devices corresponding to destination addresses 142A-N for further processing. For example, if queueing network device 120 is connected to a local device having a camera capturing data, such as camera 117A capturing data of scene 118A or camera 117B capturing data of scene 118B, the local device can send the camera data through queueing network device 120 and through WAN 140 to a destination address 142A-N. The destination address 142A-N can correspond to a device configured to analyze the camera data. Where the camera data captures footage of an assembly line (e.g., scene 118A), the device can analyze the data to, for example, identify manufacturing defects visible in the footage. Where the camera data is from a wildlife or trail camera (e.g., scene 118B), the device can analyze the data to, for example, identify wildlife and/or count a number of animals present in the camera data. As a further example, if queueing network device 120 is connected to a local device having an AR or VR device, such as AR/VR device 119, the local device can send the camera data through queueing network device 120 and through WAN 140 to a destination address 142A-N. The destination address 142A-N can correspond to a device configured to analyze the AR or VR data. The device can analyze the AR or VR data to, for example, understand patterns in user behavior while using the AR or VR device.

Queueing network device 120 is an edge device of network 130. As will be explained in more detail subsequently, queueing network device 120 is capable of temporarily storing and later forwarding outgoing data transmissions from local devices 110A-N to destination addresses 142A-N. Queueing network device 120 is also capable of receiving data from WAN 140 and forwarding that data to local devices 110. More specifically, queueing network device 120 is also capable of receiving outbound network data from local devices 110 and selectively forwarding received outbound network data to destination addresses 142A-N. Queueing network device 120 is further capable of receiving inbound network data from destination addresses 142A-N and transmitting the inbound network data to local devices 110. The inbound and/or outbound data can be, for example, one or more network packets. In some examples, the data received by queueing network device 120 from local devices 110 includes requests for data stored at one of destination addresses 142A-N. Additionally and/or alternatively, the data received by queueing network device 120 from local devices 110 includes media data and/or data from an augmented reality (AR) device and/or a virtual reality (VR) device. The media data can include video data, image data, audio data, and/or other options. The data can be sent to a destination address 142A-N by a local device 110 for storage (e.g., as a data backup) and/or for analysis (e.g., to extract features, identify objects, etc.).

Queueing network device 120 includes processor 122 and memory 124, which are substantially similar to processors 112A-N and memories 114A-N, respectively. Queueing network device 120 can also optionally include user interface 126, which is substantially similar to user interfaces 116A-N. In some examples, queueing network device 120 does not include a user interface and can be configured and/or operated using, for example, another device connected to queueing network device 120, such as a local device 110 or another component of local network 130.

System 100 optionally includes local network 130, which includes one or more devices interposed between local devices 110 and queueing network device 120 and/or between queueing network device 120 and WAN 140. In examples of system 100 that include local network 130, queueing network device 120 is a component of local network 130 and is connected to one or more other components of local network 130. Local network 130 can include any suitable combination of hardware devices such as, for example, one or more additional routers, switches, hubs, modems, bridges, and/or gateways, among other options. Local network 130 can be a wired or wireless network and can include one or more switches, routers, gateways, or other suitable network infrastructure. Local network 130 can be, for example, a local area network, a campus area network, a metropolitan area network, or another suitable network type. Generally, local network 130 connects local devices 110 that are separated by smaller geographic distances than the devices of WAN 140. In at least some examples, local network 130 is a private cellular network (PCN) including one or more PCN gateway devices. In these examples, each of local devices 110 can be connected directly to the PCN and/or can be connected to the PCN via a gateway device.

In examples where system 100 does not include local network 130, local devices 110 can be directly connected to queueing network device 120 and queueing network device 120 can be directly connected to WAN 140. Where queueing network device 120 is directly connected to WAN 140 and local devices 110, the position of queueing network device 120 causes all data transmissions to and from local devices 110 to pass through queueing network device 120. In examples where system 100 does include other components that form local network 130, queueing network device 120 is positioned in local network 130 such that all data transmissions to and from local devices 110 to pass through queueing network device 120. Local network 130 can be constructed to include a hierarchy to allow all data transmissions to and from local devices 110 to pass through queueing network device 120. For example, queueing network device 120 can be positioned on the edge of local network 130. Advantageously, positioning queueing network device 120 such that all inbound and outbound data transmissions to and from local devices 110 is received by queueing network device 120 allows queueing network device 120 to control data transmissions across communication link 141, the advantages of which are discussed subsequently.

WAN 140 is a wide area network suitable for connecting servers and other computing devices that are separated by greater geographic distances than the devices of local network 130. WAN 140 includes network infrastructure for connecting devices separated by larger geographic distances. In at least some examples, WAN 140 is the Internet. Communication link 141 connects queueing network device 120 and/or another component of local network 130 to WAN 140, such that queueing network 120 is able to receive data from local devices 110 and forward the received data to WAN 140, and further such queueing network device 120 can receive data from devices connected to WAN 140 and forward the received data to local devices 110.

Communication link 141 can be a wired or wireless connection and connects queueing network device 120 to WAN 140. In at least some examples, communication link 141 is a satellite connection. In operation, communication link 141 can be disrupted, such that queueing network device 120 becomes disconnected from WAN 140 and, consequently, local devices 110 are not able to access WAN 140 and send requests to destination addresses 142A-N. In these examples, communication link 141 can be referred to as an "intermittent connection." The disruptions to communication link 141 are generally temporary but can persist for extended periods of time while repairs, maintenance, or other suitable steps are taken to restore communication link 141. For example, where communication link 141 is a wireless connection, poor signal quality can cause disruption of communication facilitated by communication link 141 between the devices of local network 130 and the devices of WAN 140. As a further example, where communication link 141 is a wired connection, mechanical damage to communication link 141 can disrupt communication between local devices 110 and WAN 140. While communication link 141 is disrupted, local devices 110 and other devices of local network 130 are not able to communicate with and transmit data to devices connected to WAN 140.

Destination addresses 142A-N are network addresses to and from which data can be transmitted by queueing network device 120 and correspond to electronic devices connected to WAN 140. Destination addresses 142A-N are accessible via WAN 140 and can each correspond to any suitable device. In the depicted example, destination address 142A corresponds to server 144, destination address 142B corresponds to database 146, and destination address 142C corresponds to cloud compute cluster 148. Each of destination addresses 142A-N corresponds to an electronic device that is not directly connected to local devices 110, queueing network device 120, or local network 130, such that data transmissions directed to destination addresses 142A-N are facilitated through the devices and systems of WAN 140. More specifically, a data transmission from a local device 110 directed to one of destination addresses 142-N can be transmitted to queueing network device 120, which can then forward the data transmission to WAN 140 (i.e., directly or via another upstream component of network 130).

Server 144 is an electronic device that can store data and/or perform compute tasks. While server 144 is generally referred to herein as a server, server 144 can be any suitable computing device for storing data and/or performing compute tasks. Server 144 includes processor 152 and memory 154, and optionally includes user interface 156. Processor 152 and memory 154 are substantially similar to processors 112A-N, 122 and memories 114A-N, 124, respectively. User interface 156 is substantially similar to user interfaces 116A-N, 126. In some examples, server 144 does not include a user interface and can be configured and/or operated using, for example, another device connected the server(s) 144 via WAN 140 or another suitable network.

Database 146 is a network-accessible database for storing data from local devices 110 and/or other devices capable of accessing WAN 140. Database 146 includes machine-readable data storage capable of retrievably housing stored data, such as database or application data. In some examples, database 146 includes long-term non-volatile storage media, such as magnetic hard discs, optical discs, flash memories and other forms of solid-state memory, or forms of electrically programmable memories (EPROM) or electrically erasable and programmable (EEPROM) memories. Database 146 can organize data using a relational database management system (RDBMS), object-relational database management system (ORDBMS), columnar database management systems (CDBMS), document-oriented database management systems (DoDBMS) and/or a multi-model database management system (MMDBMS). Local devices 110 can query database 146 to retrieve data and further can store and/or back up data to database 146. Database 146 can include one or more devices substantially similar to server 144 and configured to perform the functions of a database.

Cloud compute cluster 148 is connected to WAN 140 and is a network-accessible compute unit or cluster for performing one or more data operations. Cloud computer cluster 148 includes one or more linked computing devices and can, for example analyze data sent from a local device 110 and send a response to the local device 110. Cloud compute cluster 148 can include one or more devices substantially similar to server 144 and configured to perform the functions of a WAN-accessible computing cluster.

Each of server 144, database 146, and cloud compute cluster 148 are connected to WAN 140 and data can be transmitted to server 144, database 146, and compute cluster 148 using destination addresses 142A, 142B, 142C, respectively. Each outgoing data transmission from a local device 110 is directed to a destination address 142A-N of WAN 140. For example, local device 110B can send a data transmission including camera data from camera 117B to destination address 142B to allow the camera data to be backed up to database 146. Similarly, local device 110A can send a data transmission including camera data from camera 117A to destination address 142B to allow the camera data from camera 117A to be backed up to database 146. As a further example, local device 110B can data from AR/VR device 119 to destination address 142B to be backed up to database 146, to destination address 142C to allow cloud compute cluster 148 to perform one or more operations on the AR/VR data, and/or to destination address 142A to allow server 144 to perform one or more operations on the AR/VR data.

Storage 160 is a physical or virtual data storage element that is configured to store outbound data transmissions from local devices 110A-N. Queueing network device 120 can store data transmissions to storage 160 and can also retrieve stored data transmissions from storage 160 for forwarding. The data transmission can be, for example, a request for data from a device at a destination address 142A-N or data to be stored or backed up to a device at a destination address 142A-N. As queueing network device 120 is positioned between local devices 110A-N and WAN 140 such that all outbound data transmissions from local devices 110A-N pass through queueing network device 120, queueing network device 120 can inspect outbound data transmissions and, as will be explained in more detail subsequently, store outbound data transmissions to storage 160 when communication link 141 is disrupted. As will also be explained in more detail subsequently, queueing network device 120 can inspect the stored outbound data transmissions and selectively forward the stored data transmissions to WAN 140 when communication link 141 is restored. In some examples, queueing network device 120 can also selectively store outbound data transmissions when, for example, communication link 152 is metered such that there are increased costs associated with transmitting data to WAN 140 via communication link 141. In some examples, memory 124 can include multiple memory devices and storage 160 can be stored on a hardware memory device of queueing network device 120 that is different than the memory device that stores network inspection module 170, forwarding module 180, or other software components of queueing network device 120. Additionally and/or alternatively, storage 160 can be stored to a partition and/or volume of a memory device (e.g., memory 124) that also stores network inspection module 170, forwarding module 180, and/or other software components of queueing network device 120. Storage 160 can be configured to store unforwarded outbound data transmissions indefinitely and/or for a particular period of time. The period of time can be selected based on, for example, the content of the outbound data transmission, the intended destination address of the outbound data transmission, or any other suitable attribute of the data transmission and/or another element of system 100.

Network inspection module 170 includes one or more programs for determining the status of communication link 141. The program(s) of network inspection module 170 can be executed by processor 122. Network inspection module 170 can inspect the status of communication link 141 by, for example, sending a test communication to one of destination addresses 142A-N or another device connected to WAN 140 that is configured to elicit a response from the destination address 142A-N or other WAN-connected device. The presence or absence of a received response to the test communication can be used to determine the status of communication link 141. As a further example, network inspection module 170 can cause processor 122 to send a request to another element of network 130 to determine the status of communication link 141. For example, network inspection module 170 can be configured to send a request to a router or another network device to determine whether communication link 141 is available. In other examples, network inspection module 170 can use another suitable method of determining the status of communication link 141. In some examples, network inspection module 170 can include one or more programs configured to determine whether communication link 141 is metered or data-capped. As will be explained in more detail subsequently, whether communication link 141 is metered or data-capped can be used to determine whether to forward outbound data transmissions across communication link 141 by the programs of forwarding module 180.

Forwarding module 180 includes one or more programs for determining whether to forward data transmissions received from a local device 110 to WAN 140. The program(s) of forwarding module 180 can be executed by processor 122. Forwarding module 180 includes a forwarding rules engine that can be used to determine whether to forward network data from local device 110. The forwarding rules engine includes one or more conditional rules that queueing network device 120 can use to determine whether to forward a data transmission from a local device 110 to WAN 140 and/or a destination address 142A-N or to store the transmission for forwarding at a later time. The forwarding rules engine can cause queueing network device 120 to selectively forward a data transmission based on, for example, the domain of a destination address 142A-N of the data transmission, network address information for a destination address 142A-N, the content of the data transmission, a data type of the data transmission (e.g., if the data is text data, video data, etc.), a memory or file size of the data transmission, and/or the status of communication link 141 (e.g., the availability of communication link 141, the bandwidth available over communication link 141, etc.), among other options. The forwarding rules engine can include conditional rules for any attribute of a data transmission and/or any element(s) of system 100 that are useful for determining whether to forward or store a data transmission for subsequent forwarding, including any of the aforementioned properties of a data transmission or system 100 (including the properties of communication link 141). Further, in some examples, the forwarding rules engine can include a trained computer-implemented machine-learning model configured to accept elements or aspects of a request or system 100 and to output a determination of whether to forward a request, as discussed in more detail subsequently. In other examples, the forwarding rules engine can be formed of components of forwarding module 180 and network inspection module 170, such that the forwarding rules engine is capable of performing logic related to determining the availability of WAN 140 and detecting whether communication over communication link 141 has been interrupted.

In some examples, certain data transmissions from a local device 110 having high value may be generally concentrated toward a single destination address. The domain of the target of the data transmission (i.e., of the target destination address 142A-N) can be used to distinguish between high-priority and low-priority data transmissions by the forwarding rules engine. Similarly, in some examples, a particular local device 110 or group of local devices 110 may be transmitting data that is considered higher priority than other local devices 110. For example, where local devices 110 include cameras capture video content of a location from multiple angles and/or positions, certain scenes may be considered more important for transmission and/or backup to a destination address 142A-N. Queueing network device 120 can use the forwarding rules engine to inspect local device 110 network address information to selectively upload and/or prioritize uploads from certain local devices 110. The content and/or data type of the data transmission can also be used to distinguish different types of outgoing data transmissions. For example, data having a particular file type may be considered to be more important in a particular context or implementation of queueing network device 120, and queueing network device 120 can accordingly prioritize transmission of those file types when communication link 141 is available. As a further example, queueing network device 120 can be configured to scan outgoing data transmission to determine the content of the data transmission and selectively forward and/or prioritize certain data transmissions based on the content of those data transmissions. As a specific example, where the data transmissions are video footage from a camera device (e.g., camera 117A or camera 117B), queueing network device 120 can use one or more computer-implemented machine-learning models to recognize objects in the video footage and selectively upload and/or prioritize the uploading of video footage including particular objects. Queueing network device 120 can also use the file or memory size of a data transmission to determine whether and in what order to upload outgoing data transmissions. For example, it may be advantageous in some systems to selectively upload smaller files, and then to later upload larger files. In other examples, other combinations or particularities of file or memory size may be useful to selectively transmitting data and/or prioritizing the transmission of data by queueing network device 120.

Further, forwarding module 180 can also be used to store data for later forwarding when communication link 141 is operable but transmission across communication link 141 is metered or data-capped. For example, if communication link 141 is metered or data-capped during particular time periods, queueing network device 120 can selectively store outgoing data transmissions to avoid costs during those particular time periods and then upload or forward the stored transmissions at a later time when communication link 141 is not metered or data-capped. For example, program(s) of network inspection module 170 can classify communication link 141 as disrupted or otherwise unavailable during a metered or data-capped time period and program(s) of forwarding module 180 can accordingly store outbound data transmissions to storage 160 for later forwarding outside of the metered or data-capped time period. As a further example, program(s) of forwarding module 180 can receive a classification from program(s) of network inspection module 170 that communication link 141 is metered or data-capped, and the status of communication link 141 as metered or data-capped can be used by the forwarding rules engine to selectively forward certain outgoing data transmissions and store other outgoing data transmissions. For example, the forwarding rules engine can be configured to cause processor 122 to store data transmissions over a certain size when communication link 141 is metered or data-capped and to forward data transmissions under that size. Forwarding module 180 can apply similar logic to examples where bandwidth across communication link 141 is limited. If bandwidth across communication link 141 is limited, queueing network device 120 can, for example, prioritize data transmissions having a lower file size and/or data transmissions that are particularly important (i.e., for a particular application or system in which queueing network device 120 is deployed) according to the other rules of the forwarding rules engine. Forwarding module 180 can be configured to allow queueing network device 120 to compare available bandwidth to transmission size in order to more efficiently utilize communication link 141 when bandwidth is limited. Advantageously, storing large files to storage 160 when bandwidth is limited can free bandwidth over communication link 141 for other data transmissions from local devices 110 and/or devices of WAN 140.

If communication link 141 is disrupted such that data cannot be transmitted from queueing network device 120 to WAN 140, forwarding module 180 can cause processor 122 to store outbound requests to storage 160. When communication link 141 is restored, forwarding module 180 can cause processor 122 to forward stored requests to the appropriate destination address 142A-N. Further, forwarding module 180 can also be used to create a forwarding order to prioritize the transmission of certain data when communication link 141 is restored. For example, forwarding module 180 can first cause processor 122 to forward data of a particular type, particular size, or directed for a particular destination address and then to forward data of another particular type, of a particular size, or directed to another particular destination address. In some examples, data stored to storage 160 can be prioritized and transmitted in a transmission-by-transmission manner when communication link 141 is restored. Additionally and/or alternatively, data stored to storage 160 can be sorted into groups or tiers, and prioritized and transmitted group-by-group or tier-by-tier when communication link 141 is restored. In yet further examples, data stored to storage 160 can be transmitted when communication link 141 is restored without being ordered or prioritized.

System 100 and queueing network device 120 provide a number of advantages. Queueing network device 120 allows for selective storage of outgoing data transmissions and later forwarding of the stored outgoing data transmissions without requiring the applications of local devices 110 to be configured to store the outgoing data transmissions or queue data that was not successfully transmitted to be transmitted after when communication link 141 is available and/or when communication link is not metered or data-capped. Rather, queueing network device 120 can scan outgoing data transmissions and selectively store (and later forward) data transmissions independently of the operation of local devices 110. Further, as described previously, the position of queueing network device 120 between local devices 110 and WAN 140 allows all outbound requests to passively be transmitted through (i.e., be received by) queueing network device 120. That is, by positioning queueing network device 120 at a funnel or chokepoint (e.g., of local network 130) between local devices 110 and WAN 140, queueing network device 120 can intercept and scan all requests from local network 110 devices to WAN 140 devices without requiring local devices 110 or applications running on local devices 110 to be configured to specifically send data to queueing network device 120. In this manner, queueing network device 120 is advantageously able to provide temporary data transmission storage and later, subsequent forwarding to local devices 110 and applications of local devices 110 that are not otherwise configured to store and subsequently forward data transmissions. Queueing network device 120 is thereby advantageously able to be incorporated into existing systems and does not require any modification of other devices of those existing systems to provide selective data storage and forwarding capabilities, as described herein.

Queueing network device 120 confers advantages to systems where communication link 141 is subject to relatively frequent disruption, such as where communication link 141 is a wireless connection (e.g., a cellular or satellite connection). For example, in applications of remotely placed camera systems, queueing network device 120 can be added between the camera system and a cellular or satellite connection to queue and prioritize data backup of the camera data generated by the camera system. In some examples, cameras may be placed to collect valuable footage in relatively remote locations, such that wired connections are not available. Using the example of scene 118B described with respect to FIG. 1, a trail camera or wildlife camera is likely to be placed in a location where connection to a WAN is facilitated by a disruptable wireless connection. Queueing network device 120 can be added to such a camera system to allow programs or systems that expect a continuous and/or persistent WAN connection to be used with minimal or no reconfiguration. Similarly, using the example of scene 118A described with respect to FIG. 1, a factory or assembly line may be positioned to be located next to important or strategic resources where it may be difficult to provide camera 117A with a wired connection. A disruptable wireless connection may be used instead of a wired connection to decrease costs associated with installation. In other examples, there may be other considerations that make it advantageous to connect a factory environment to a WAN using a disruptable wireless connection. In those examples, queueing network device 120 can provide local network-wide transmission queueing without requiring further investment in reconfiguration of software or programs that expect a continuous and/or persistent network connection. Further, in some examples, it may be advantageous to deploy an AR or VR apparatus (e.g., AR/VR device 119) in a remote location. Such a deployment may be temporary and further it may be difficult to connect a remote location with a wired connection. Queueing network device 120 can be installed in such a system to allow applications of the AR or VR system that expect a persistent and/or continuous network connection to run without encountering errors or requiring reconfiguration. Queueing network device 120 also provides the aforementioned advantages to systems connected to a WAN via a wired connection. For example, a wired connection extending through a remote area may be subject to mechanical damage from weather, animals, etc.

For some legacy systems, it can be significantly time- and labor-intensive to upgrade systems of a local network 110 to detect the status of communication link 141 and queue outgoing data transmissions when communication link 141 is interrupted or inoperable. Advantageously, queueing network device 120 can store and selectively forward data transmissions from legacy systems without requiring upgrading of those legacy systems.

Notably, queueing network device 120 stores data transmissions from local devices 110 without creating any error messages or otherwise alerting local devices 110 of the status of communication link 141. Advantageously, this can reduce the incidence of errors that disrupt the operation of local devices 110 and/or require intervention from a human operator to remedy. Further, local devices 110 are not required to be configured to detect the status of communication link 141 when queueing network device 120 is used, as queueing network device 120 handles logic and queueing of outgoing data transmissions as well as temporary storage of outgoing data transmission when communication link 141 is unavailable.

As described previously, in some examples, communication link 141 may be a data-capped connection or a connection that is metered by a service provider (e.g., by an internet service provider), such that reducing data transferred across communication link 141 can reduce costs associated with operating communication link 141. Additionally and/or alternatively, accessing and/or receiving a return from a destination address 142A-N may incur costs from the entity maintaining the device to which the destination address 142A-N corresponds. For example, cloud compute cluster 148 can be monetized such that data requests to cloud compute cluster 148 require payment to be processed. Further, cloud compute cluster 148 can be monetized such that the payment rate for processing a request varies based on time of day, day of week, or another time-based element. Queueing network device 120 can advantageously reduce data transfer during period where payment is required or where increased payment is required to process outgoing requests without requiring reconfiguration of local devices 110 or the applications of local devices 110. Specifically, queueing network device 120 can block outgoing data transmissions during those time periods and store the transmissions to storage 160. Queueing network device 120 can then deliver those data transmissions during a later time period when payment is not required or when increased payment is not required. As described previously, queueing network device 120 can be integrated into existing networks to reduce data consumption and transmission across a data-capped or metered communication link without requiring reconfiguration of any local devices of the network or of any applications of those devices.

While FIG. 1 depicts only three local devices 110A-N and four destination addresses 142A-N, in other examples, system 100 can include any other suitable number of local devices 110A-N and destination addresses 142A-N. While FIG. 1 also depicts destination address 142A as corresponding to server 144, destination address 142B as corresponding to database 146, and destination address 142C as corresponding to cloud compute cluster 148, each of destination addresses 142A-N can correspond to any suitable electronic device or system. Further, while FIG. 1 depicts only one queueing network device 120, in some examples, multiple queueing network devices 120 can be positioned at various choke or funnel points between local network 130 and WAN 140.

Queueing network device 120 can be a custom device incorporated at a funnel or chokepoint at an edge location between local devices 110 and communication link 141 (e.g., at an edge of an existing local network 130). Additionally and/or alternatively, queueing network device 120 can be created by providing an existing network edge device with storage 160 and the programs of network inspection module 170 and forwarding module 180. For example, if storage 160 is relatively small in size, an existing network edge device can be configured with network inspection module 170 and forwarding module 180 to function as queueing network device 120 without additional hardware modification of the existing network edge device. In examples where storage 160 requires more storage than is available on an existing network edge device, the existing network edge device can be provided with additional hardware memory elements such that the existing network edge device has sufficient storage for storage 160. The existing edge device can be, for example, a router, a switch, or a gateway, among other options.

Notably, existing methods of queueing outbound data transmissions require creation or modification of software in an application-by-application and/or device-by-device manner. Accordingly, these existing methods are often labor-intensive and expensive to implement. Conversely, system 100 allows for a queueing network device 120 to perform forwarding logic for all devices connected to the queueing network device and/or local network 130, and thereby does not require any reconfiguration or modification of local devices 110 or the applications or programs thereof to provide transmission forwarding logic.

Figure 2:
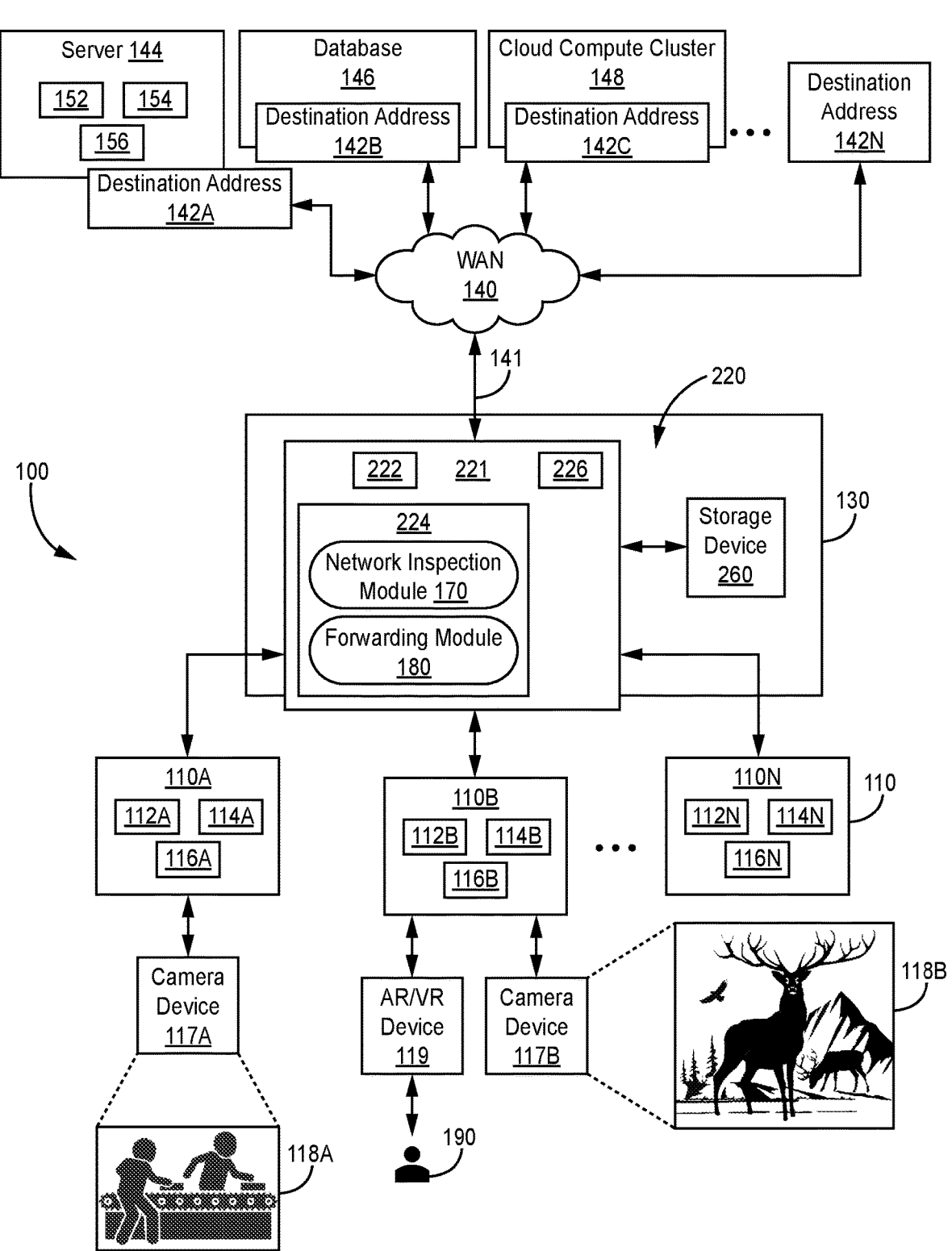
FIG. 2 is a schematic view of a further example of a system for data transmission queueing and prioritization.

Further, although queueing network device 120 has been described herein as a single device, in some examples the network and forwarding functions and the storage function of queueing network device 120 can be incorporated into separate devices, such that queueing network device 120 is composed of separate storage and edge devices. FIG. 2 depicts system 200, which is another example of a system for outbound request queueing and prioritization that separate storage and edge devices. System 200 is substantially similar to system 100 but includes queueing system 220 instead of queueing network device 120. Queueing system 220 includes edge device 221 and storage device 260. Edge device 221 includes processor 222 and memory 224, and optionally includes user interface 226. Processor 222 is substantially similar to processor 122; memory 224 is substantially similar to memory 124, and user interface 226 is substantially similar to user interface 126. Storage device 260 includes storage and can optionally include a processor, memory, and/or a user interface. The storage, processor, memory, and user interface can be substantially similar to storage 160, processor 122, memory 124, and user interface 126, respectively. Advantageously, system 200 allows for a separate storage device 260 having a relatively large size to be combined with existing network edge devices to form a queueing system, reducing the cost and labor required to incorporate queueing systems and devices according to the present disclosure into existing local networks.

In system 200, edge device 221 is connected to WAN 140 and local devices 110 directly and/or via one or more components of local network 130. Edge device 221 includes network inspection module 170 and forwarding module 180. Storage device 260 is directly connected to edge device 221 such that edge device 221 is able to store and request data from storage device 260. In system 200, edge device 221 performs the forwarding and inspection functions of queueing network device 120 and storage device 260 performs the functions of storage 160, as described previously with respect to FIG. 1.

In operation, edge device 221 receives and forwards transmissions between local devices 110 and the devices of WAN 140. Edge device 221 also inspects outgoing data transmissions and/or the status of communication link 141, and further selectively stores outgoing data transmissions to storage device 260. Edge device 221 can also retrieve stored data transmissions to storage device 260 and forward the retrieved data transmission to a destination address 142A-N. Edge device 221 can retrieve data transmissions by, for example requesting the data transmission or a copy of the data transmission from storage device 260.

System 200 and queueing system 220 allow the advantages of queueing network device 120 to be more easily implemented on existing network infrastructure. Queueing network device 120 requires a large amount of data storage in some examples to store data transmissions from local devices 110. Conversely, network inspection module 170 and forwarding module 180 have relatively small storage sizes and can be stored to smaller hardware memory units that may be present on existing network edge devices. Accordingly, edge device 221 can be created by configuring an existing network edge device (e.g., a router, gateway, etc.) with the programs of network inspection module 170 and forwarding module 180 without requiring upgrading or modification of the hardware elements of the existing network edge device. Storage device 260 can be any suitable electronic device having a large amount of storage and connected to queueing network device 120. Storage device 260 having sufficient data storage can be separately constructed and connected to edge device 221 to create queueing system 220 without requiring hardware modification or reconfiguration of edge device 221. For example, storage device 260 can be a storage server or network attached storage (NAS) device that can be connected to edge device 221.

Figure 3:
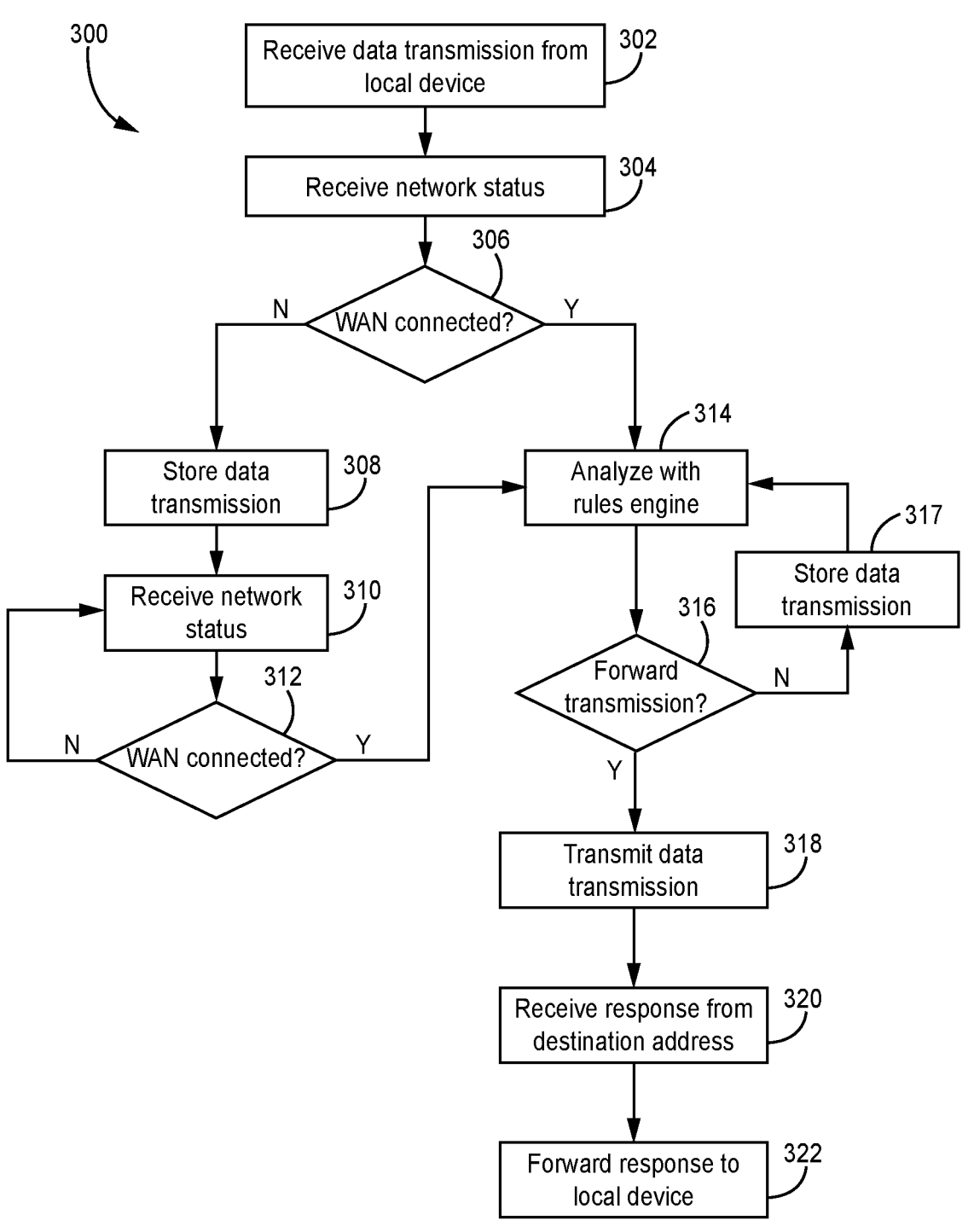
FIG. 3 is a flow diagram of an example of a method selective data transmission suitable for use with the systems of FIGS. 1 and 2.

FIG. 3 is a flow diagram of method 300, which is a method of selective data transmission performable by queueing network device 120 (FIG. 1) and queueing system 220 (FIG. 2). Method 300 includes steps 302-322 of receiving a data transmission from a local device (step 302), receiving a network status (step 304), determining whether the queueing network device or system is connected to a WAN (step 306), storing the data transmission (step 308), receiving a network status (step 310), determining whether the queueing network device or system is connected to a WAN (step 312), analyzing the data transmission with a rules engine (step 314), determining whether to forward the data transmission (step 316), storing the data transmission (step 317), transmitting the data transmission (step 318), receiving a response from the destination address (step 320), and forwarding the response to the local device (step 322). Method 300 will be discussed generally with respect to system 100 and queueing network device 120 (FIG. 1) for explanatory purposes, but method 300 can be adapted to be used with any suitable system for data transmission storage, forwarding, and/or queueing (e.g., system 200 and/queueing system 220; FIG. 2).

In step 302, queueing network device 120 receives a data transmission from a local device 110. The data transmission is an outbound data transmission intended for a destination address 142A-N accessible via WAN 140. The destination address 142A-N is only accessible when communication link 141 is operable. The data transmission can be, for example, a request for a service or data from a device or system corresponding to the destination address 142A-N. The data transmission can also be, for example, outgoing data to be backed up or stored by a device or system corresponding to the destination address 142A-N.

In step 304, queueing network device 120 receives a network status. The network status describes the status of communication link 141. Queueing network device 120 can use one or more programs of network inspection module 170 to inspect the status of communication link 141. For example, queueing network device 120 can use one or more programs of network inspection module 170 to send a test communication to a device or system connected to WAN 140 and determine the status of communication link 141 based on whether queueing network device 120 receives a response from the device or system within a particular time period.

In step 306, queueing network device 120 detects whether queueing network device 120 is connected to WAN 140 based on the network status received in step 304. Specifically, if communication link 141 is interrupted, queueing network device 120 can determine that queueing network device 120 is not connected to WAN 140. Conversely, if communication link 141 is available, queueing network device 120 can determine that queueing network device 120 is connected to WAN 140. The combination of steps 304 and 306 allows queueing network device 120 to detect interruptions to the connection between queueing network device 120 and WAN 140 and, in some examples, steps 304 and 306 can be performed substantially simultaneously or can be performed as a single step of method 300.

If queueing network device 120 is not connected to WAN 140, method 300 proceeds to step 308. In step 308, queueing network device 120 stores the data transmission received in step 302 to storage 160. Step 308 can be performed in response to a determination in step 306 that WAN 140 is not connected to queuing network device 120. Queueing network device 120 can be configured to automatically store the received data transmission to storage 160 upon determining that queueing network device 120 is not connected to WAN 140 in step 306.

In step 310, queueing network device again receives a network status describing whether communication link 141 is available. Step 310 is substantially similar to step 304, but is performed after the data transmission has been stored to storage 160. In step 312, queueing network device 120 detects whether queueing network device 120 is connected to WAN 140 based on the network status received in step 310. Step 312 is substantially similar to step 306, but is performed using the network status received in step 310 rather than the network status received in step 304.

The combination of step 310 and step 312 allows queueing network device 120 to detect whether the connection between queueing network device 120 and WAN 140 has been restored or remains interrupted. If queueing network device 120 detects that WAN 140 is connected in step 314, the connection between queueing network device 120 and WAN 140 (i.e., communication link 141) has been restored. If queueing network device 120 detects that WAN 140 is not connected in step 312, method 300 returns to step 310 and continues to periodically detect the status of communication link 141. Queueing network device 120 can be configured to periodically detect the status of communication link 141 using any suitable interval of time.

If queueing network device 120 detects that the connection between queueing network device 120 and WAN 140 has not been interrupted in steps 304, 306 or that the connection has been restored in steps 310, 312, method 300 proceeds to step 314. In step 314, the outgoing data transmission received in step 302 is analyzed using a forwarding rules engine. In step 316, queueing network device 120 determines whether to forward the data transmission based on the results of the analysis performed in step 314. In combination, steps 314 and 316 allow queueing network device 120 to determine whether to forward the data transmission to the intended destination address of the data transmission by analyzing the data transmission using the forwarding rules engine.

The forwarding rules engine used in step 314 includes one or more conditional rules that can be used by processor 122 to determine whether the outbound data transmission received in step 302 should be forwarded to the destination address at the time at which steps 314, 316 are performed or whether the outbound data transmission should be or remain stored to storage 160 and be forwarded at a later time. The conditional rules of the forwarding rules engine can be stored to memory 124 of queueing network device 120 and, in some examples, can be encoded as a table, array, matrix, database, or other suitable structure. As described previously, the forwarding rules engine can include conditional rules relating to, for example, a network address element of the destination address to which the data transmission is directed (e.g., the domain of the server), a network address of the local device, the memory or file size of the data transmission, the bandwidth available on communication link 141, or any data metering or data caps to which communication link 141 or the destination address are subject, among other options. In some examples, the forwarding rules engine can also include one or more conditional rules for the network statuses received in steps 304 and 310, such that processor 122 can inspect the contents of the outbound request (e.g., a domain or another element of the request) as well as the operational status and/or another aspect of system 100 (e.g., the operational status of communication link 141) according to the conditional rules of the forwarding rules engine in step 314.

If processor 122 determines that the outbound transmission should not be forwarded, method 300 proceeds to step 317. In step 317, the outbound data transmission is stored to storage 160 if the outbound transmission was not previously stored in step 308. For example, if queueing network device 120 detects that communication link 141 is operational and WAN 14 is available in step 306, but determines according to analysis performed in step 314 that the outbound transmission should not be forwarded (e.g., due to bandwidth constraints of communication link 141, metering of communication link 141, etc.), the data transmission is stored to storage 160 in step 317 for forwarding at a later point in time. As a specific example, if the data transmission has a particularly large size (e.g., a size over a particular threshold), the bandwidth of communication link 141 is limited such that transmission of the data would prevent or hinder transmission of other data, and the data transmission is not time-sensitive such that the operation of system 100 or another system would not be negatively affected by delayed transmission of the data, the data transmission can be stored to storage 160 for forwarding at a later point in time.

Method 300 then proceeds back to step 314 at a later point in time to determine whether, at the later point in time, the conditions of communication link 141, queueing network device 120, or any other suitable aspect of system 100 have changed such that the data transmission should be forwarded. Steps 314 and 316 can be performed repeated until processor 122 has determined that the data transmission should be forwarded. The period of time or interval in which iterations of steps 314, 316 are performed can be selected to be any suitable length. If the data transmission analyzed in steps 314, 316 was previously stored to storage 160 in step 308 or in a subsequent iteration of step 317, step 317 can be skipped or omitted and the copy of the data transmission already stored to storage 160 can be preserved until the transmission is forwarded.

In some examples, a machine-learning algorithm can be used to perform step 314 and/or step 316 of method 300. The machine-learning algorithm can be trained to, for example, accept parameters of system 100 and/or an element of a data transmission from a local machine 110 and output a determination of whether the data transmission should be forwarded immediately or substantially immediately, or whether the data transmission should be stored for later forwarding. The machine-learning algorithm can be trained using, for example, a forwarding rules engine including one or more conditional rules. Additionally and/or alternatively, the machine-learning algorithm can be trained using a labeled training set of data transmissions or of data transmission information (e.g., header information, etc.). Advantageously, using a machine-learning model to determine whether to forward a data transmission provides greater flexibility to a system including a queueing network device according to the present disclosure. More specifically, a trained computer-implemented machine-learning model can be configured to recognize a broader range of data transmissions and conditions as suitable for storing a data transmission for later forwarding or suitable for immediate or substantially immediate forwarding of a data transmission. Further, the pattern-recognition capabilities of a trained computer-implemented machine-learning model can allow recognition of situations where it is useful to store and/or forward data transmissions that are difficult for a human programmer or operator to recognize.

If processor 122 determines in step 316, according to analysis performed using the forwarding rules engine in step 314, that the data transmission should be forwarded, method 300 proceeds to step 318. In step 318, queueing network device 120 transmits the data transmission to the destination address 142A-N to which the data transmission is directed. Step 318 can be performed in response to a determination in step 318 that the data transmission should be forwarded. Queueing network device 120 can transmit the data transmission to the destination address by, for example, transmitting the data transmission across communication link 141 to one or more components of WAN 140 that then transmit the data transmission to the intended destination address 142A-N. Where the data is stored to storage 160, the data can be transmitted by, for example, transmitting a copy of the data from storage 160. The data can subsequently be deleted from storage 160.

In step 320, queueing network device 120 receives a response from the destination address in response to the data transmission transmitted in step 318. Step 320 is optional and can be included in method 300 when the data transmitted in step 318 is a request to a device corresponding to the destination address 142A-N, such that the device produces and sends a reply transmission in response to the request. The device or system at the destination address 142A-N to which a request was sent in step 318 (i.e., where the forwarded data transmission is a request) can create and send a reply following step 318. The reply can be transmitted through WAN 140 and across communication link 141 to queueing network device 120. The reply can include destination address information for one of local devices 110 such that queueing network device 120 and/or other components of network 130 can determine the local device 110 of local devices 110A-N to which the response is directed. In step 322, queueing network device 120 forwards the response received in 320 to the intended local device 110 (i.e., the local device 110 to which the response is directed). Step 322 is also optional and is included in method 300 in examples that include step 320.

Method 300 advantageously allows for evaluation of the status of communication link 141 and storage of outgoing data transmissions when communication link 141 is interrupted or otherwise inoperable. Method 300 also advantageously allows for the evaluation and analysis of individual data transmissions that are sent to queueing network device to determine whether the data transmission should be forwarded or be stored to storage 160 (or remain in storage 160). All functions of method 300 can be performed automatically by the programs of queueing network device 120, such that queueing network device 120 can be installed in an existing or newly-created network system and automatically begin inspecting and selectively forwarding outgoing data transmissions from local devices connected to queueing network device 120 according to method 300. While method 300 is generally described herein with respect to a single data transmission, method 300 can be performed any number of times for multiple and/or all data transmissions received by queueing network device 120.

Figure 4:
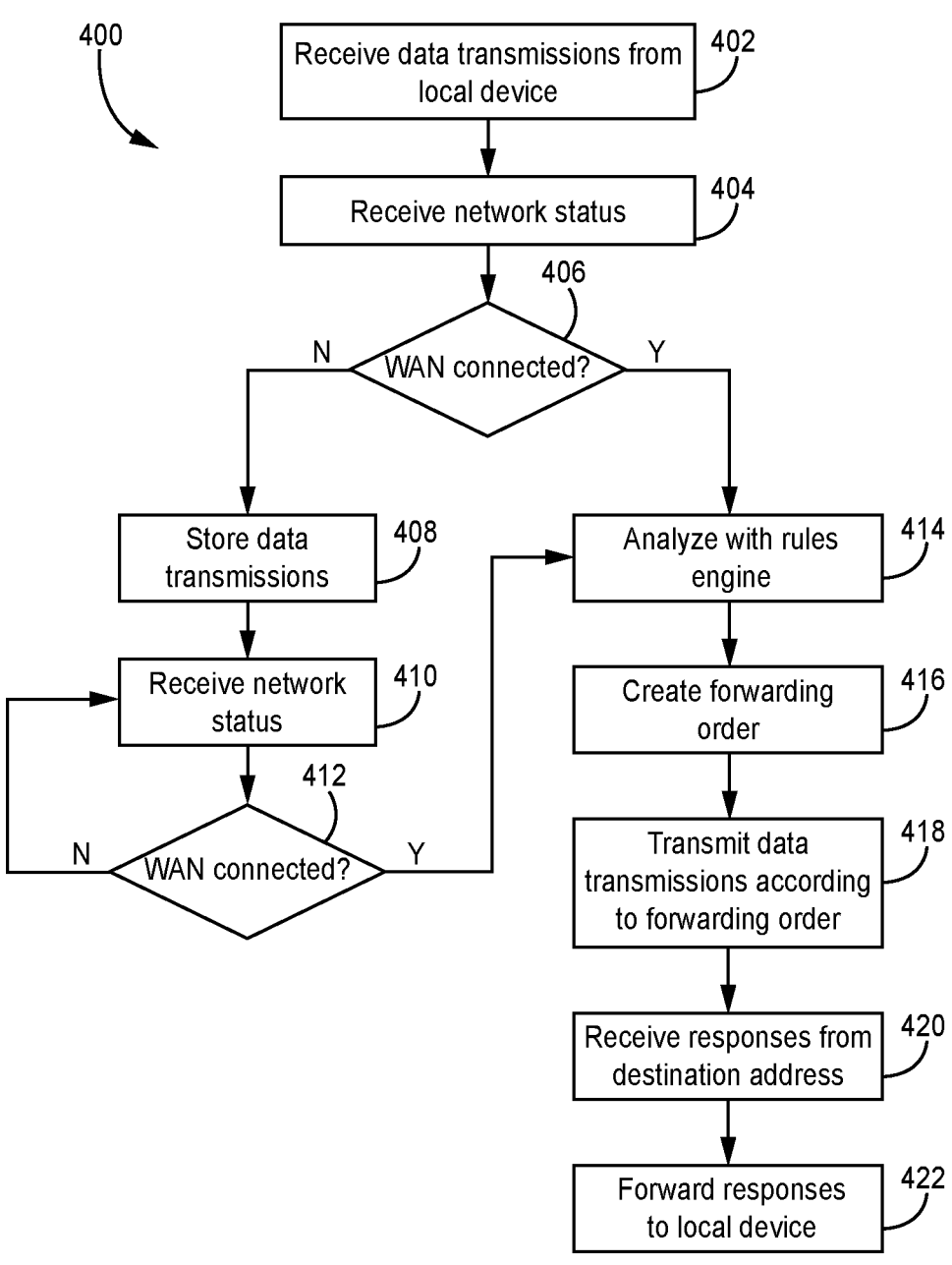
FIG. 4 is a flow diagram of an example of a method of data transmission queueing suitable for use with the systems of FIGS. 1 and 2.

FIG. 4 is a flow diagram of method 400, which is an example of a method of data transmission queueing that can be performed by queueing network device 120. Method 400 allows queueing network device 120 to order outgoing data transmissions into a forwarding order and then transmit those data transmissions according to the forwarding order. Method 400 includes steps 402-422 of receiving data transmissions from local device(s) (step 402), receiving a network status (step 404), detecting whether the queueing network device or system is connected to a WAN (step 406), storing the received data transmissions (step 408), receiving a network status (step 410), detecting whether the queueing network device or system is connected to the WAN (step 412), analyzing the received data transmissions with a rules engine (step 414), creating a forwarding order (step 416), transmitting the data transmissions according to the forwarding order (step 418), receiving responses from the destination address(es) (step 420), and forwarding the response to the local device(s) (step 422).

Step 402 is substantially similar to step 302 of method 300 (FIG. 3), except that queueing network devices receives more than one data transmission in step 402. Steps 404 and 406 are substantially similar to steps 304 and 306, respectively, of method 300 (FIG. 3) and can be performed in the same or substantially the same manner. Step 408 is substantially similar to step 408 of method 300 (FIG. 3), but all data transmissions received in step 402 are stored to storage 160. That is, in step 408, multiple data transmissions are stored to storage 160. Steps 410 and 412 are substantially similar to steps 310 and 312, respectively, of method 300 (FIG. 3) and can be performed in the same or substantially the same manner.

Method 400 proceeds to step 414 if queueing network device 120 detects that communication link 141 is operable or has been restored in step 406 or step 412. In step 416, queueing network device creates a forwarding order based on the analysis in step 414. The forwarding order describes an order in which to transmit the data transmissions received in step 402. The forwarding order can order data transmissions to be transmitted sequentially and/or can order data transmissions to be transmitted in sets or tiers. For example, the forwarding order can order data transmissions such that a first data transmission and a second data transmission are sent at the same time or substantially the same time, a third transmission is sent after the first and second transmissions, a fourth and fifth transmission are sent at the same time or substantially the same time after the third transmission is sent, etc. In combination, steps 414 and 416 allow queueing network device 120 to analyze the data transmissions received in step 402 with a forwarding rules engine to generate the forwarding order.

In step 414, queueing network device 120 analyzes the data transmissions received in step 402 with a forwarding rules engine. The forwarding rules engine used in step 414 includes one or more conditional rules that can be used by processor 122 to determine an order or priority of an outbound data transmission received in step 402 that can be used to create a forwarding order in step 416. The conditional rules of the forwarding rules engine can be stored to memory 124 of queueing network device 120 and, in some examples, can be encoded as a table, array, matrix, database, or other suitable structure. As described previously, the forwarding rules engine can include conditional rules relating to, for example, a network address element of the destination address to which the data transmission is directed (e.g., the domain of the server), the memory or file size of the destination address, the bandwidth available on communication link 141, or any data metering or data caps to which communication link 141 or the destination address are subject, among other options. In some examples, the forwarding rules engine can also include one or more conditional rules for the network statuses received in steps 404 and 406, such that processor 122 can inspect the contents of the outbound request (e.g., a domain or another element of the request) as well as the operational status and/or another aspect of system 100 (e.g., the operational status of communication link 141) according to the conditional rules of the forwarding rules engine in step 414.

In step 416, queueing network device 120 creates forwarding order based on the analysis performed in step 414. The forwarding rules engine can be configured to, for example, determine a priority of a data transmission and the forwarding order can be created using the priority information. The forwarding order can be created using the forwarding rules engine, another program of forwarding module 180, or any other suitable program of queueing network device 120. The forwarding order created in step 416 can be used to queue outgoing data transfers to reduce congestion across communication link 141.

In some examples, a machine-learning algorithm can be used to perform step 414 and/or step 416 of method 400. The machine-learning algorithm can be trained to, for example, accept parameters of system 100 and/or an element of a data transmission from a local machine 110 and output a forwarding order. The machine-learning algorithm can be trained using, for example, a forwarding rules engine including one or more conditional rules. Additionally and/or alternatively, the machine-learning algorithm can be trained using a labeled training set of data transmissions or of data transmission information (e.g., header information, etc.). The use of a computer-implemented machine learning model to perform step 414 and/or step 416 confers substantially the same advantages as described previously with respect to the use of a computer-implemented machine learning model to perform step 314 and/or step 316 of method 300 (FIG. 3).

In step 418, queueing network device 120 transmits the data transmissions according to the forwarding order. The data transmissions are transmitted in step 418 to the destination address 142A-N or destination addresses 142A-N to which the data transmissions are directed. Queueing network device 120 can transmit the data transmissions to the destination address(es) by, for example, transmitting the data transmissions across communication link 141 to one or more components of WAN 140 that then transmit the data transmissions to the intended destination address(es) 142A-N. The data transmissions are queued at queueing network device 120 and are transferred according to the order specified in the forwarding order. As described previously, the forwarding order can specify a sequential order of each outgoing data transmission and/or the forwarding order can specify groups or tiers of priority for the outgoing data transmissions. In examples where the data transmissions are stored to storage 160, the data can be transmitted by, for example, transmitting copies of the data transmissions from storage 160. The data transmissions can subsequently be deleted from storage 160.

In step 420, queueing network device 120 receives a response from the destination address(es) in response to the data transmissions transmitted in step 418. Step 420 is optional and can be included in method 400 when one or more of the data transmissions forwarded in step 418 are requests to a device corresponding to the destination address 142A-N, such that the device produces and sends a reply transmission in response to the request. The device or system at each destination address 142A-N to which a request was sent in step 418 can create and send a reply following step 418. The reply or replies can be transmitted through WAN 140 and across communication link 141 to queueing network device 120. The reply or replies can each include destination address information for one of local devices 110 such that queueing network device 120 and/or other components of network 130 can determine the local device 110 of local devices 110A-N to which each response is directed.

In step 422, queueing network device 120 forwards the response received in step 420 to local devices 110. More specifically, queueing network device 120 forwards each response received in step 420 to the local device 110 to which the response is directed. Step 422 is also optional and is included in method 400 in examples that include step 420.

Method 400 advantageously allows queueing network device 120 to create a forwarding order that can be used to prioritize data transfers across communication link 141 when bandwidth across communication link 141 is limited or communication link 141 is expected to be operational for a limited period of time (e.g., if communication link 141 is a satellite or other wireless connection that is expected to be operational for a limited duration). When bandwidth across communication link 141 is limited, unordered or unqueued transfers can cause data congestion across communication link 141, potentially decreasing the performance of applications of local devices 110 performing important or critical functions. The forwarding orders created using method 400 can be used to reduce congestion across communication link 141 by queueing data transmissions according to their relative priority, improving the performance of important or critical applications of local devices 110 by deprioritizing access of communication link 141 by applications having less importance to the function of system 100 or another system, such as systems relevant to operating or conducting a business.

Queueing network device 120 can be configured to automatically recognize when bandwidth across communication link 141 is limited or communication link 141 is expected to be operational for a limited period of time and perform method 400 to select data transmissions to transmit according to the calculated priority of those data transmissions. All functions of method 400 can be performed automatically by the programs of queueing network device 120, such that queueing network device 120 can be installed in an existing or newly-created network system and automatically begin inspecting outgoing data transmissions and ordering those data transmissions according to a forwarding order according to method 400.

Figure 5:
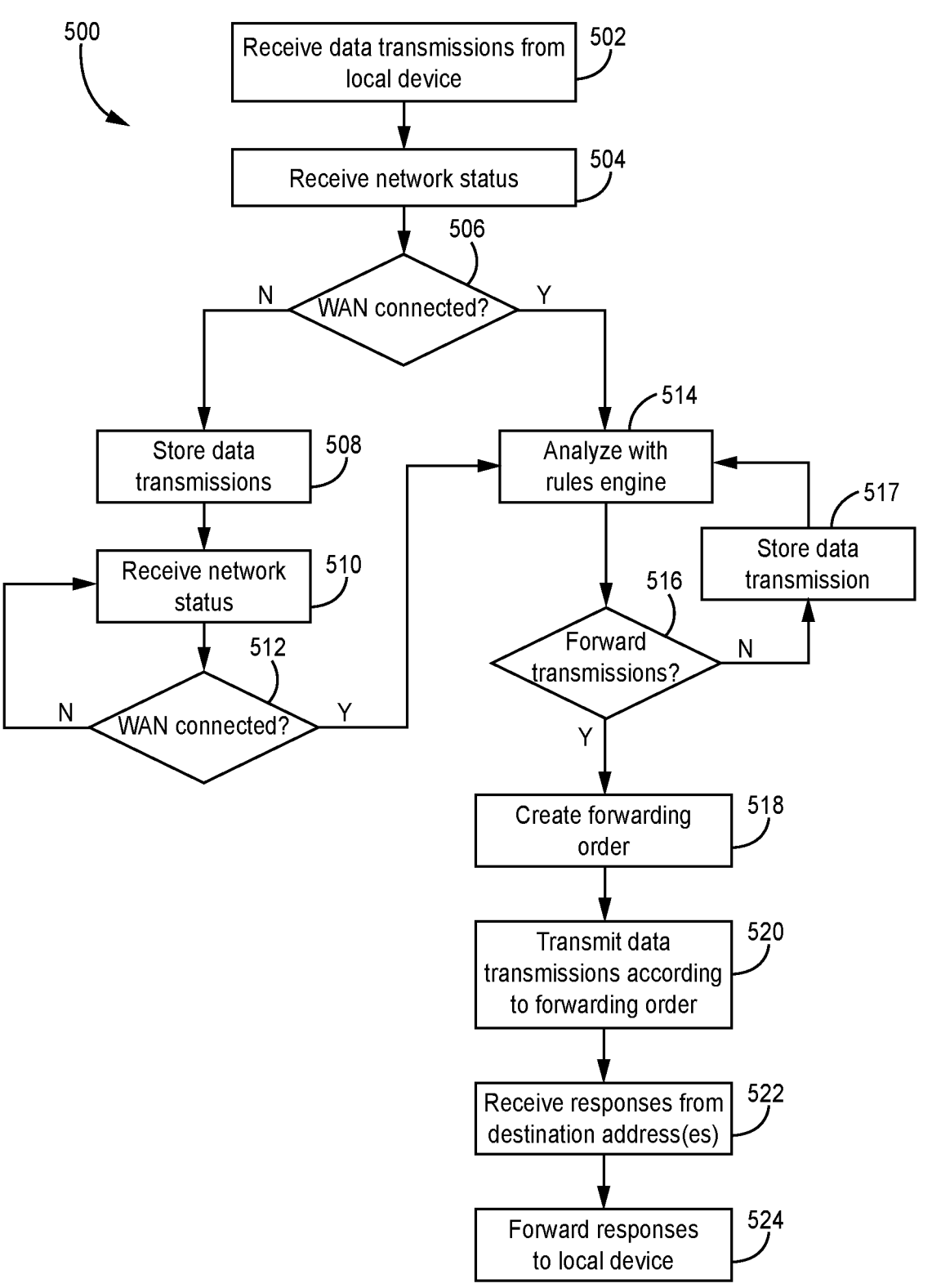
FIG. 5 is a flow diagram of an example of a method of selective data transmission forwarding and data transmission queueing suitable for use with the systems of FIGS. 1 and 2

FIG. 5 is a flow diagram of method 500, which is an example of a method of selective data transmission forwarding and data transmission queueing performable by queueing network device 120. Method 500 incorporates aspects of method 300 (FIG. 3) and method 400 (FIG. 4), and includes steps 502-524 of receiving data transmissions from local device(s) (step 502), receiving a network status (step 504), detecting whether the queueing network device or system is connected to a WAN (step 506), storing the received data transmissions (step 508), receiving a network status (step 510), detecting whether the queueing network device or system is connected to the WAN (step 512), analyzing the received data transmissions with a rules engine (step 514), determining whether to forward the data transmissions (step 516), storing unforwarded data transmissions (step 517), creating a forwarding order (step 518), transmitting the data transmissions according to the forwarding order (step 520), receiving responses from the destination address(es) (step 522), and forwarding the response to the local device(s) (step 524).

Steps 502-512 are substantially similar to steps 402-412 of method 400 (FIG. 4) and can be performed in substantially the same manner as described previously with respect to method 400. Method 500 proceeds to step 514 when queueing network device 120 detects that communication link 141 is operable or restored such that queueing network device 120 is connected to WAN 140 in steps 506 or 512. In step 514, the outgoing data transmissions received in step 502 are analyzed using a forwarding rules engine. In step 516, queueing network device 120 determines whether to forward any of the received data transmissions based on the results of the analysis performed in step 514. In combination, steps 514 and 516 allow queueing network device 120 to determine whether to forward the data transmission to the intended destination address of the data transmission by analyzing the data transmission using the forwarding rules engine.

The forwarding rules engine used in step 514 includes one or more conditional rules that can be used by processor 122 to determine whether any of the outbound data transmissions received in step 502 should be forwarded to the destination address at the time at which steps 514, 516 are performed or whether the outbound data transmission should be or remain stored to storage 160 and be forwarded at a later time. The forwarding rules engine and the conditional rules can be substantially the same as the forwarding rules engine and conditional rules used to perform method 300 (FIG. 3), as described previously. Further, step 514 and/or step 516 can be performed using a trained computer-implemented machine-learning model, as described previously with respect to step 314 and step 316 of method 300.

In some examples, processor 122 can analyze the data transmissions received in step 402 and group data transmissions according to the results of the analysis performed in steps 514, 516. As processor 122 performs method 500, and more specifically as processor 122 performs step 516 of method 500, processor 122 can segregate data transmissions into groups according to whether the data transmissions should be forwarded. Processor 122 can perform steps 518-524 for those data transmissions that should be forwarded according to step 516 and can perform step 517 and subsequent iterations of steps 514, 516 for data transmissions that should not be forwarded according to the determination in step 516. Processor 122 can examine each data transmission individually to determine whether the data transmission should be forwarded and sort the data transmissions accordingly. Processor 122 can perform different steps of method 500 on each group of data transmissions. As processor 122 continues to perform iterations of steps 514, 516 on data transmissions that are not initially forwarded, processor 122 can continue to determine that certain data transmissions should be forwarded and perform additional iterations of steps 518-524 using those data transmissions. Processor 122 can perform iterations of steps 514, 516 until all data transmissions received in step 502 have been selected for forwarding. Additionally and/or alternatively, processor 122 can be configured to perform only a certain number of iterations of steps 514, 516 on a data transmission and, subsequently, stop performing method 500.

In other examples, forwarding module 180 can be configured so that processor 122 does not create groups of data transmissions according to determinations made in step 516, and instead proceeds through the same steps of method 500 for all data transmissions received in step 402. In some of these examples, processor 122 can determine whether to forward all data transmissions received in step 402 by analyzing each data transmission individually, such that if queueing network device 120 determines that one transmission should not be forwarded in step 516, all data transmissions received in step 402 are not forwarded. In yet further of these examples, processor 122 determines whether to forward all data transmissions received in step 402 based on an aggregate analysis of all data transmissions received in step 402.

If processor 122 determines that any outbound transmission should not be forwarded, method 500 proceeds to step 517 for those data transmissions. The data transmissions stored can be all, fewer than all, or none of the data transmissions analyzed in steps 514, 516 of method 500. In step 517, outbound data transmissions that are not suitable for immediate or substantially immediate forwarding are stored to storage 160. More specifically, if queueing network device 120 detects that communication link 141 is operational and WAN 140 is available in step 506 or in step 512, but determines according to analysis performed in step 514 that one or more outbound transmissions should not be forwarded, the data transmissions are stored to storage 160 in step 517 for forwarding at a later point in time. Step 517 is substantially similar to step 317 of method 300 (FIG. 3) and the forwarding rules engine can select certain transmissions for storage in step 517 rather than forwarding in step 520, discussed subsequently, according to the same considerations as described previously with respect to step 317 of method 300.

Following step 517, method 500 then proceeds back to step 514 at a later point in time to determine whether, at the later point in time, the conditions of communication link 141, queueing network device 120, or any other suitable aspect of system 100 have changed such that the data transmission should be forwarded. Steps 514 and 516 can be performed repeatedly until processor 122 has determined that the data transmission should be forwarded. The period of time or interval in which iterations of steps 514, 516 are performed can be selected to be any suitable length. If the data transmission analyzed in steps 514, 516 was previously stored to storage 160 in step 508 or in a subsequent iteration of step 517, step 517 can be skipped or omitted and the copy of the data transmission already stored to storage 160 can be preserved until the transmission is forwarded.

For groups of data transmissions that processor 122 determines are suitable for forwarding according to the analysis performed in steps 514, 516, method 500 proceeds to step 518. In step 518, processor 122 creates a forwarding order. The forwarding order can be created as described previously with respect to step 416 of method 400 (FIG. 4). The forwarding order can be created using conditional rules of a forwarding rules engine, as described previously with respect to step 416 of method 400. Further, step 418 can be performed using a trained computer-implemented machine-learning model, as described previously with respect to step 416 method 400.

The forwarding order describes an order in which to transmit groups of data transmissions which, following an iteration of steps 514, 516, queueing network device 120 determines should be forwarded. Advantageously, the forwarding order created in step 516 can be used to queue outgoing data transmissions to reduce congestion across communication link 141. As described previously, the forwarding order can specify a sequential order for each outgoing data transmission and/or the forwarding order can specify groups or tiers of priority for the outgoing transmissions.

In step 520, the data transmissions are transmitted according to the forwarding order created in step 518. Step 520 can be performed in the same manner as step 418 of method 400 (FIG. 4) and confers substantially the same advantages as step 418 of method 400.

In step 522, queueing network device 120 receives responses from devices corresponding to destination addresses to which data transmission were sent in step 520. In step 524, queueing network device 120 forwards the responses received in step 522 to local devices 110 to which the responses are directed. Steps 522 and 524 are optional and can be performed in the same situations as described previously with respect to steps 320, 322 of method 300 (FIG. 3) and steps 420, 422 of method 400 (FIG. 4).

Method 500 advantageously incorporates steps of both method 300 and method 400, and accordingly provides the advantages of both method 300 and method 400. Like method 300, method 500 allows for evaluation of the status of communication link 141 and storage of outgoing data transmissions when communication link 141 is interrupted or otherwise inoperable. Method 500 also advantageously allows for the evaluation and analysis of individual data transmissions that are sent to queueing network device to determine whether the data transmission should be forwarded or be stored to storage 160 (or remain in storage 160). Like method 400, method 500 advantageously allows queueing network device 120 to create a forwarding order that can be used to prioritize data transfers across communication link 141 when bandwidth across communication link 141 is limited or communication link 141 is expected to be operational for a limited period of time (e.g., if communication link 141 is a satellite or other wireless connection that is expected to be operational for a limited duration). As described previously, when bandwidth across communication link 141 is limited, unordered or unqueued transfers can cause data congestion across communication link 141, potentially decreasing the performance of applications of local devices 110 performing important or critical functions. The forwarding orders created using method 500 can be used to reduce congestion across communication link 141 by queueing data transmissions according to their relative priority, improving the performance of important or critical applications of local devices 110 by deprioritizing access of communication link 141 by applications having less importance to the function of system 100 or another system, such as systems relevant to operating or conducting a business. Accordingly, method 500 can be performed by queueing network device 120 to confer the advantages of both transmission evaluation and outbound transmission queueing conferred by methods 300 and 400.

Notably, method 500 advantageously allows multiple levels of priority to be used in the determination of data transmission forwarding order. Method 500 allows higher priority data transmissions to be forwarded before lower priority data transmissions by use of elements of method 300, and also allows data transmissions within each relative priority level to be further ordered according to relative priority by use of elements of method 400.

Methods 300, 400, and 500 confer advantages to examples where local devices 110 are reliant on a wireless or otherwise easily disruptable communication link 141. Applications and software are often reliant on a persistent or continuous network connection and can encounter errors when attempting to transmit data to WAN 140 when communication link 141 is interrupted. For example, a camera system in a remotely-located wilderness area can use methods 300, 400, 500 to selectively upload and/or queue outbound data transmissions to WAN-connected devices for backup and/or analysis. As another example, a camera system in a factory environment using a wireless or disruptable connection can use methods 300, 400, 500 to selectively upload and/or queue outbound data transmissions. As yet a further example, a remotely-deployed AR or VR apparatus or system can use methods 300, 400, 500 to selectively upload and/or queue outbound data transmissions. Other examples of systems that benefit from the advantages provided by methods 300, 400, 500 are possible and contemplated herein, and the specific examples provided herein are illustrative and non-limiting.

Figure 6:
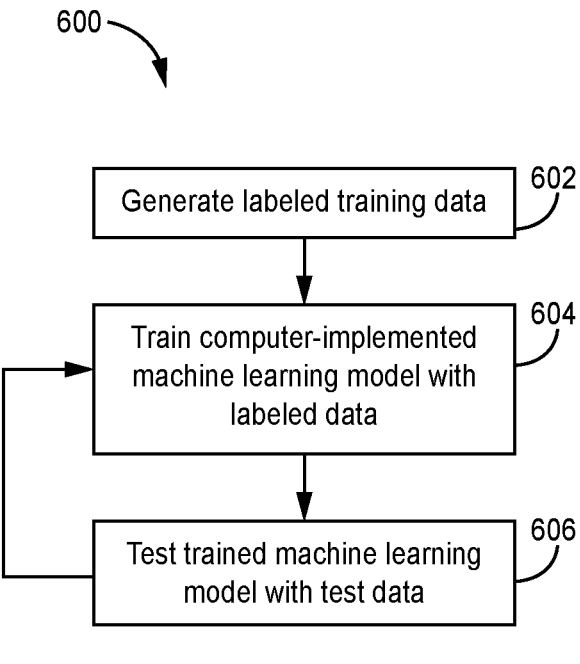
FIG. 6 is a flow diagram of an example of a method of training a computer-implemented machine-learning model suitable for use with the methods of FIGS. 3-5.

FIG. 6 is a flow diagram of method 600, which is a method of training a machine-learning algorithm according to the present disclosure. Machine-learning algorithms trained according to method 500 are capable of accepting as inputs one or more aspects or elements of a request (e.g., a packet header element, etc.) and/or one or more aspects of systems 100, 200 (e.g., the operational status of communication link 141). Method 600 can be used to train a machine-learning algorithm to output a determination as to whether a data transmission should be forwarded. Method 600 can also be used to train a machine-learning algorithm to output a forwarding order and/or to output prioritization data that can be used to produce a forwarding order. Method 600 includes steps of 602-606 of generating labeled training data (step 602), training a computer-implemented machine-learning model with the labeled data (step 604), and testing the trained computer-implemented machine-learning model with test data (step 606).

In step 602, labeled training data is generated. The labeled data can be, for example, labeled requests from local devices 110, labeled data that is extractable from requests from local devices 110, and/or labeled data describing the operational status of elements of systems 100, 200 (e.g., the operational status of communication link 141), among other options. The training data can be created, for example, by collecting a set of outbound data transmissions from local devices 110 and labeling each request according to whether the request should be forwarded and/or under what conditions of system 100 and/or system 200 each data transmission should be forwarded. The training data can also be, for example, one or more forwarding orders and/or prioritization data. For example, a set of training transmissions can be labeled with a value that represents that priority of the transmission and used to train a computer-implemented machine-learning model in the subsequent steps of method 500.

In step 604, the labeled data is used to train the computer-implemented machine-learning model. As used herein, "training" a computer-implemented machine-learning model refers to any process by which parameters, hyper parameters, weights, and/or any other value related to model accuracy are adjusted to improve the fit of the computer-implemented machine-learning model to the training data.

In step 606, the trained computer-implemented machine-learning model is tested with test data. The test data used in step 606 is unlabeled data of the same variety as the training data that is used to qualify and/or quantify performance of the trained computer-implemented machine-learning model. More specifically, a human or machine operator can evaluate the performance of the machine-learning model by evaluating the fit of the model to the test data. As depicted in FIG. 5, steps 604 and 606 can be performed iteratively to improve the performance of the machine-learning model. More specifically, if the fit of the model to the unlabeled data determined in step 606 is undesirable, step 606 can be repeated to further adjust the parameters, hyper parameters, weights, etc. of the model to improve the fit of the model to the test data. Step 606 can then be repeated with a new set of unlabeled test data to determine how the adjusted model fits the new set of unlabeled test data. If the fit continues to be undesirable, further iterations of steps 604 and 606 can be performed until the fit of the model becomes desirable.

Method 600 advantageously allows for the use of computer-implemented machine-learning models to perform various functions of network inspection module 170, forwarding module 180, and/or a forwarding rules engine. As described previously, computer-implemented machine-learning models can impart great flexibility to the queueing network devices described herein and can allow a greater variety of outbound transmissions to be recognized by the storing and forwarding logic used by the queueing network devices. For example, computer-implemented machine-learning models can be used to increase the range of data transmissions to which a limited set of conditional rules can be applied in, for example, steps 314, 316 of method 300 (FIG. 3), steps 414, 416 of method 400, and/or steps 514, 516, 518 of method 500.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

The invention claimed is:

1. A method of selectively forwarding data transmissions to a wide area network, the method comprising:
 receiving, from at least one local device and by a network device interposed between the at least one local device and the wide area network, a first data transmission directed to a first destination address accessible through the wide area network;
 receiving, from the at least one local device and by the network device, a second data transmission directed to a second destination address accessible through the wide area network;
 detecting, by the network device, that a connection between the network device and the wide area network has been interrupted;
 storing, after detecting that the connection has been interrupted, the first data transmission and the second data transmission to a storage device electronically connected to the network device;
 detecting, by the network device and after storing the first data transmission and the second data transmission, that the connection has been restored;
 generating, by the network device and after detecting that the connection has been restored, a forwarding order by analyzing the first data transmission and the second data transmission using a forwarding rules engine, the forwarding order describing an order in which to transmit the first data transmission and the second data transmission; and
 transmitting, after generating the forwarding order, the first data transmission from the storage device to the first destination address and the second data transmission from the storage device to the second destination address according to the forwarding order.

2. The method of claim 1, wherein transmitting the first data transmission and the second data transmission comprises:

transmitting a copy of the first data transmission from the storage device to the first destination address;
deleting the first data transmission from the storage device after transmitting the copy of the first data transmission;
transmitting a copy of the second data transmission from the storage device to the second destination address; and
deleting the second data transmission from the storage device after transmitting the copy of the second data transmission.

3. The method of claim 1, wherein transmitting the first data transmission and the second data transmission comprises:
 retrieving, by the network device, the first data transmission from the storage device;
 transmitting, by the network device, the retrieved first data transmission to the first destination address;
 retrieving, by the network device, the second data transmission from the storage device; and
 transmitting, by the network device, the retrieved second data transmission to the second destination address.

4. The method of claim 3, wherein:
 retrieving the first data transmission from the storage device comprises requesting, by the network device, a copy of the first data transmission from the storage device;
 transmitting the retrieved first data transmission comprises transmitting the copy of the first data transmission to the first destination address;
 retrieving the second data transmission from the storage device comprises requesting, by the network device, a copy of the second data transmission from the storage device; and
 transmitting the retrieved second data transmission comprises transmitting the copy of the second data transmission to second destination address, and further comprising deleting the first data transmission from the storage device after requesting the copy of the first data transmission and deleting the second data transmission from the storage device after requesting the copy of the second data transmission.

5. The method of claim 4, and further comprising:
 receiving, by the network device and after transmitting the first data transmission, a first response from the first destination address;
 forwarding, by the network device, the first response to the at least one local device;
 receiving, by the network device and after transmitting the second data transmission, a second response from the second destination address; and
 forwarding, by the network device, the second response to the at least one local device.

6. The method of claim 1, wherein analyzing the data transmission using the forwarding rules engine comprises analyzing a first domain of the first destination address and analyzing a second domain of the second destination address.

7. The method of claim 1, wherein analyzing the first data transmission and the second data transmission using the forwarding rules engine comprises analyzing a network address of the at least one local device.

8. The method of claim 1, wherein analyzing the first data transmission and the second data transmission using the forwarding rules engine comprises:
 inspecting the first data transmission to identify a first data type;

inspecting the second data transmission to identify a second data type; and analyzing the data type using the forwarding rules engine to generate a forwarding order.

9. The method of claim 1, wherein the at least one of the first data transmission and the second data transmission comprises a request for data.

10. The method of claim 1, wherein:

at least one of the first destination address and the second destination address corresponds to a network-accessible database; and a corresponding at least one of the first data transmission and the second data transmission comprises an outbound data transfer to the network-accessible database.

11. The method of claim 1, wherein:

at least one of the first destination address and the second destination address corresponds to a network-connected compute unit configured to perform one or more computational operations; and a corresponding at least one of the first data transmission and the second data transmission comprises a request to perform the one or more computational operations.

12. The method of claim 1, wherein at least one of the first data transmission and the second data transmission comprises data from at least one of an augmented reality device and a virtual reality device.

13. The method of claim 1, wherein analyzing the first data transmission and the second data transmission using the forwarding rules engine comprises analyzing the first data transmission and the second data transmission using a computer-implemented machine learning model trained to:

accept, as inputs, data transmissions; and output the forwarding order.

14. The method of claim 1, wherein the first destination address and the second destination address are different.

15. The method of claim 1, wherein analyzing the first data transmission and the second data transmission comprises analyzing at least one of a file size of the at least one of the first data transmission and the second data transmission, a data type of the at least one of the first data transmission and the second data transmission, and a content of the at least one of the first data transmission and the second data transmission.

16. The method of claim 11, wherein generating the forwarding order comprises analyzing a property of the connection.

17. A system comprising:

a network device connected to at least one local device and to a wide area network, wherein the network device is interposed between the at least one local device and the wide area network, and the at least one local device is configured to transmit data to at least one destination address accessible through the wide area network, the network device configured to receive data transmissions from the at least one local device and to selectively forward data transmissions to destination addresses accessible through the wide area network, the network device comprising:

a processor; and at least one memory encoded with instructions that, when executed cause the processor to:

receive a first data transmission from the at least one local device, the first data transmission directed for a first destination address accessible through the wide area network;

receive a second data transmission from the at least one local device, the second data transmission directed for a second destination address accessible through the wide area network;

detect that a connection between the network device and the wide area network has been interrupted;

store the first data transmission and the second data transmission to a storage device electronically connected to the network device in response to detecting that a connection between the network device and the wide area network has been interrupted;

detect, after storing the first data transmission and the second data transmission, that the connection has been restored;

analyze, in response to detecting that the connection has been restored, the first data transmission and the second data transmission using a forwarding rules engine to generate a forwarding order, the forwarding order describing an order in which to transmit the first data transmission and the second data; and transmit the first data transmission from the storage device to the first destination address and the second data from the storage device to the second destination address according to the forwarding order.

18. The system of claim 17, wherein the instructions, when executed, cause the processor to generate the forwarding order by analyzing, using the forwarding rules engine, at least one of a file size of the first data transmission, a data type of the first data transmission, a content of the first data transmission, a domain of the first destination address, a network address of the at least one local device, a file size of the second data transmission, a data type of the second data transmission, a content of the second data transmission, and a domain of the second destination address.

19. The system of claim 17, wherein instructions, when executed, cause the processor to wherein generate the forwarding order by analyzing a property of the connection.

20. The system of claim 17, wherein the first destination address and the second destination address are different.

* * * * *